Dec. 16, 1969      E. I. GERTLER ET AL      3,484,744
APPARATUS FOR VERIFYING OR PRODUCING CHECK DIGIT NUMBERS
Filed Feb. 14, 1967                         3 Sheets-Sheet 1
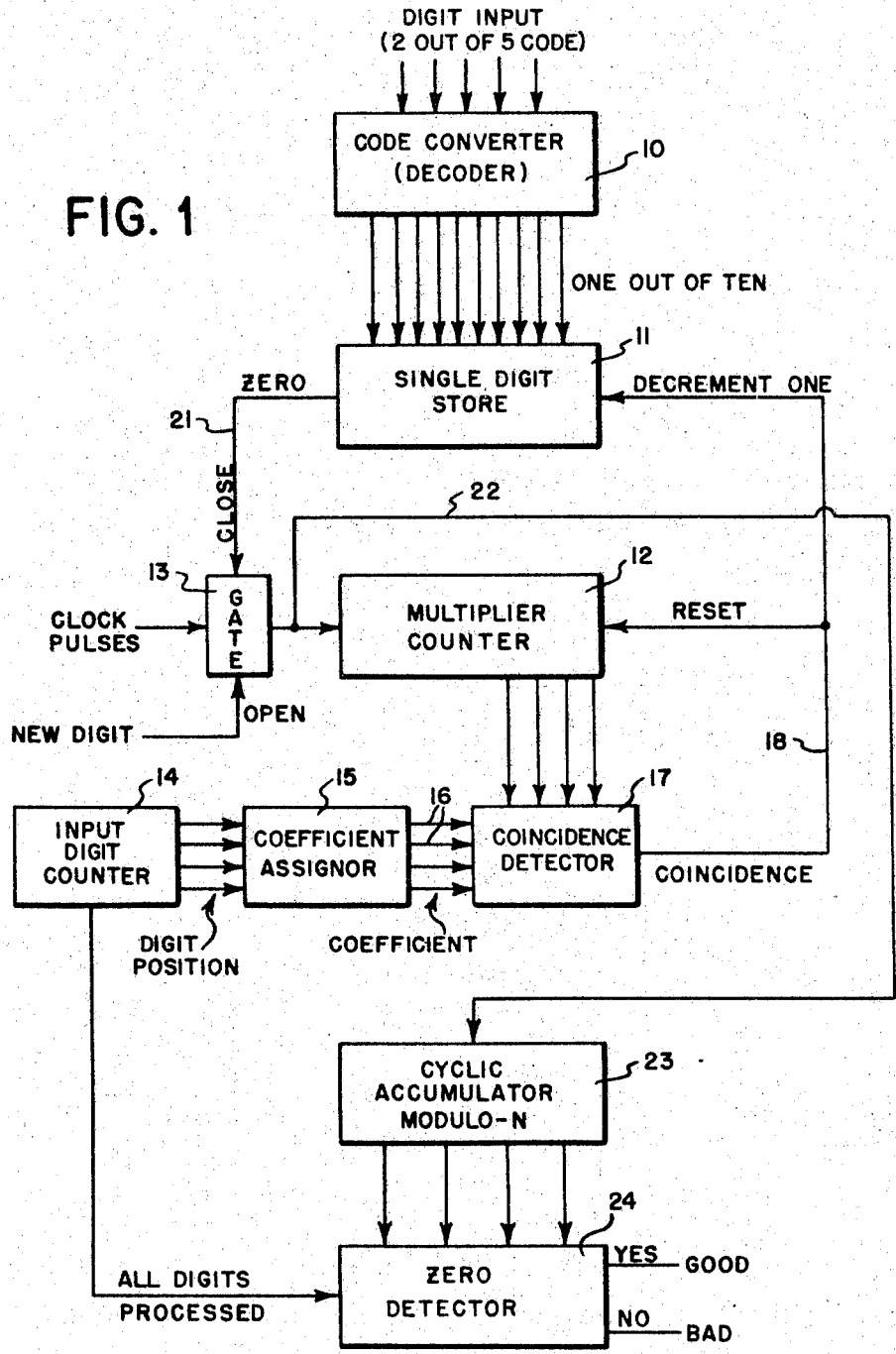
INVENTORS
EUGENE I. GERTLER
STANLEY J. WOOD
BY
ATTORNEYS

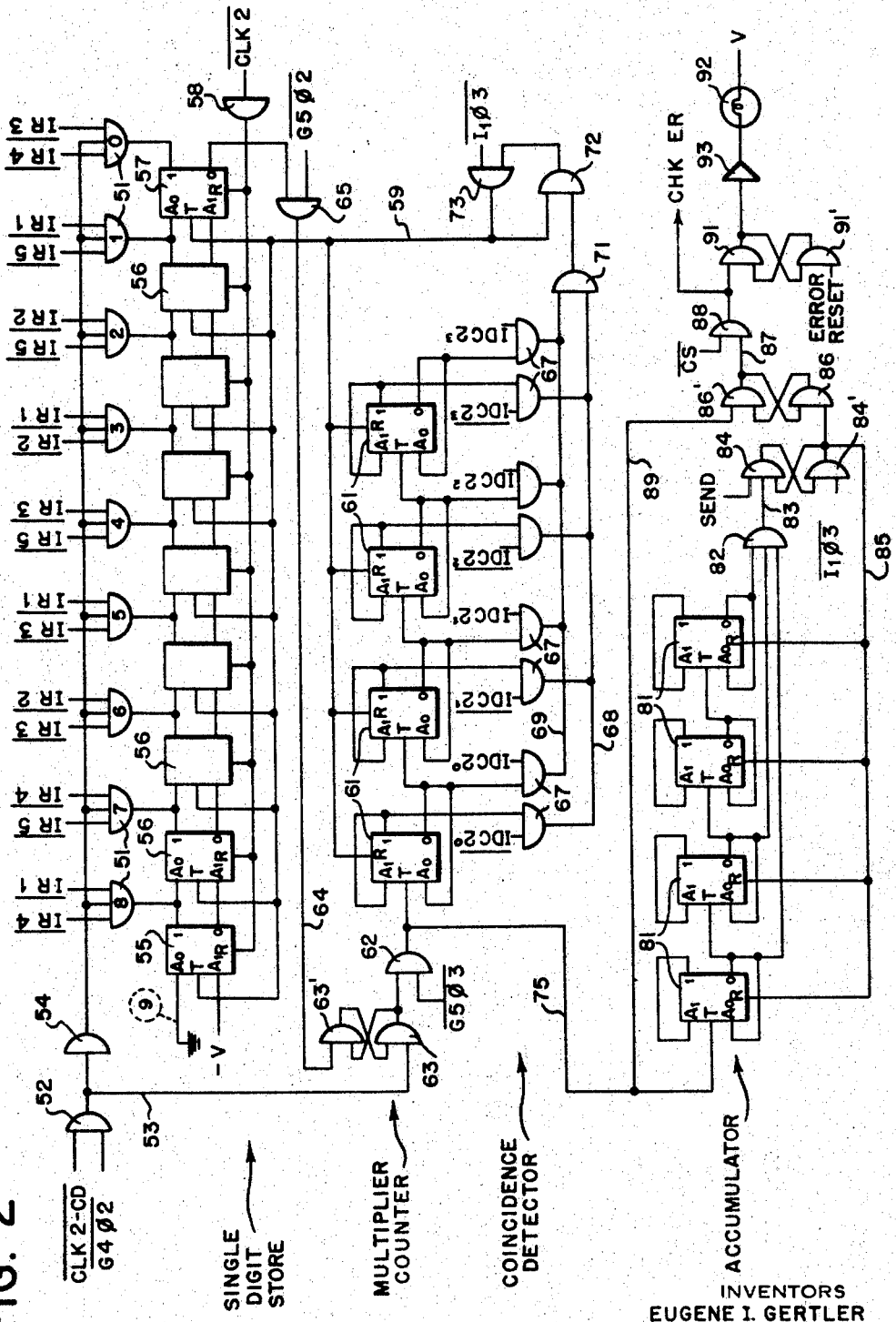

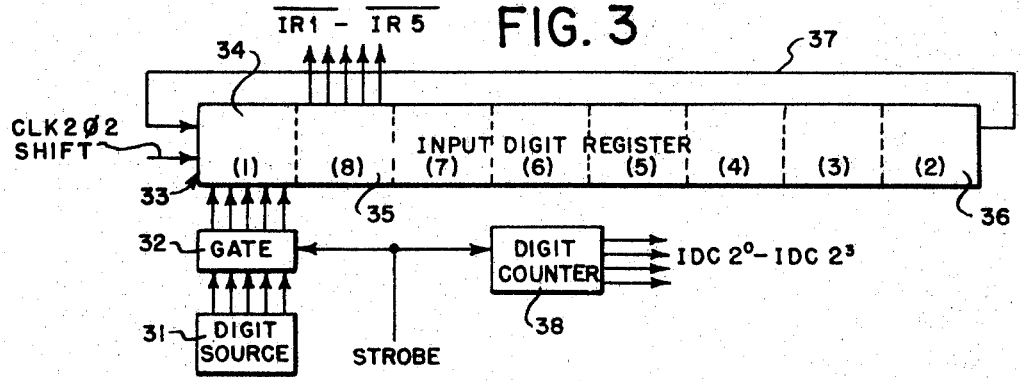
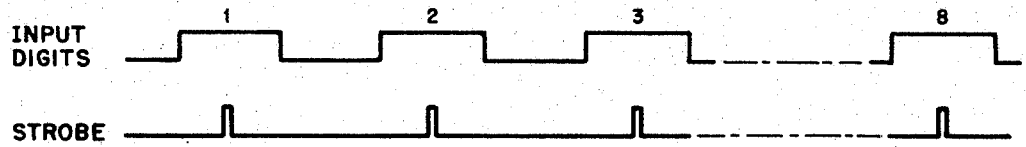
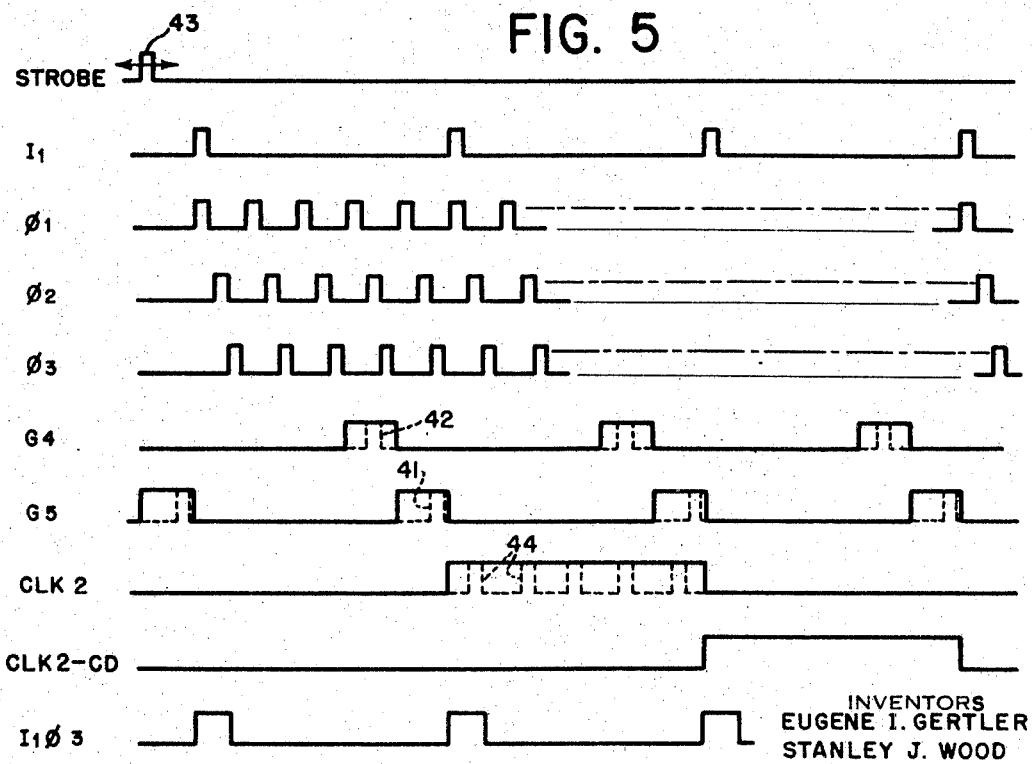

United States Patent Office 3,484,744
Patented Dec. 16, 1969

---

3,484,744
APPARATUS FOR VERIFYING OR PRODUCING CHECK DIGIT NUMBERS
Eugene I. Gertler, Cinnaminson, and Stanley J. Wood, Deptford, N.J., assignors to Ultronic Systems Corp., Pennsauken, N.J., a corporation of Delaware
Filed Feb. 14, 1967, Ser. No. 615,975
Int. Cl. G08b 29/00; G06f 11/00
U.S. Cl. 340—146.1                  2 Claims

ABSTRACT OF THE DISCLOSURE

Digits $Y_n$ of a multi-digit number are received serially. A digit counter produces weighting coefficients $X_n$ for respective digits. Groups of pulses $Y_n \times X_n$ are produced for respective digits in the number and are applied to a cyclic accumulator which counts in the modulo number system on which the check digit is based. When all the digits have been processed, the accumulator registers the remainder of the sum of the weighted digits in the modulo system, and may be sensed to verify a check digit number or used to produce the check digit.

CROSS-REFERENCES TO RELATED APPLICATIONS

The verification apparatus of the present invention may be used in the Validity Checking System described in U.S. application Ser. No. 543,646 filed Apr. 19, 1966, but is not confined thereto.

BACKGROUND OF THE INVENTION

Multi-digit numbers such as account numbers used in electronic data processing equipment frequently include a "check" digit for verification. A common procedure involves assigning weights or coefficients to each digit position in the number, multiplying each digit by its respective coefficient, summing the products, and determining the appropriate check digit which, when added to the sum of the products, results in a number of zero remainder in an appropriate number system. The number systems most commonly used for this purpose are modulo 9 and modulo 11. The check digit is then inserted in the number, usually at its beginning or end.

Verifying such a number involves a series of mutliplications by predetermined multipliers (the coefficients), accumulation of the products, and division by the appropriate modulus. Examination of the remainder then indicates the validity of the number, a non-zero remainder indicating an invalid number.

The necessary arithmetic can be performed by a computer using conventional techniques, but involves considerable computing capacity and hence expense. The present invention provides apparatus for verifying check digit numbers which is considerably simpler and less expensive. The invention can also be used to determine the check digit for a multi-digit number.

SUMMARY OF THE INVENTION

In accordance with the invention, a multi-digit number is received serially, digit by digit. The digits may be denoted $Y_n$ where $Y$ denotes the digit value and $n$ the position of the digit in the number. Counting means are provided for counting the digits as they are received. Weighting means is provided which is responsive to the counting means and produces predetermined weighting coefficients $X_n$ for respective digits, where X denotes the value and $n$ the digit position. Means are provided for producing groups of pulses equal to $Y_n \times X_n$ for respective digits in the number. These groups of pulses are applied to a cyclic accumulator which counts cyclically in the modulo number system on which the check digit is based. When all digits have been processed, the count registered in the accumulator is the remainder of the sum of the weighted digits of the number in the selected modulo system.

If a number containing a check digit is to be verified, the remainder should be a predetermined number, usually zero, and the accumulator is sensed to determine whether this is true. If a proper check digit is to be determined, the remainder may be sensed and the appropriate number to bring it to zero determined.

More specifically, the multi-digit number is applied serially to a digit register and a weighting coefficient count is produced by the digit counter for each digit. A pulse counter is supplied with pulses after each digit is entered. Coincidence means is used to determine coincidence between the pulse counter and one of the digit and coefficient values. Upon coincidence the pulse counter is reset and reduces the other of said values by one. This continues upon successive coincidences until the other value has been reduced to zero, or in general until a change in count has occurred which corresponds to the initial value entered, whereupon the pulse counter is interrupted until the next digit is entered. The procedure repeats for each digit, with a new weighting coefficient as required, thereby yielding $Y_n \times X_n$ pulses for each digit which are applied to the cyclic modulo accumulator.

Preferably, as described in the specific embodiments given hereinafter, coincidence is determined between the pulse counter and the weighting coefficient, and the digit register is counted down one for each coincidence.

Although the multi-digit numbers specifically discussed herein are written in the decimal system, since these are most commonly used, it will be understood that the term "digit" includes any character expressable in a number system. Thus, alphabet characters are sometimes used in place of numerals, but represent numerals, as in telephone dialing systems.

Further features are described in the specific embodiments.

BRIEF DESCRIPTION OF THE DRAWINGS

FIG. 1 is a block diagram illustrating one embodiment of the invention;

FIG. 2 is a logic diagram illustrating a detailed embodiment of the invention;

FIG. 3 is a block diagram illustrating the source of certain signals used in FIG. 2; and FIGS. 4 and 5 illustrate timing relationships of signals used in FIGS. 2 and 3.

DESCRIPTION OF THE PREFERRED EMBODIMENTS

Referring to FIG. 1, coded digit signals are supplied to a code converter or decoder 10 adapted to convert the digits to a decimal or "one out of ten" number system. The input signals are here assumed to be in two-out-of-five code. However, other digit inputs codes may be used and converter 10 designed accordingly. Parallel input is shown, but serial input with appropriate conversion may be employed. The digits are stored one at a time in register 11, which may be a 10-bit register.

A multiplier counter 12 is supplied with clock pulses via gate 13. When a new digit is present in register 11, gate 13 is opened to supply the clock pulses to counter 12. After the register 11 has been counted down to zero, as will be described, the gate 13 is closed until a new digit has been entered.

The input digits are counted in counter 14 and the output thereof controls the weighting coefficient assignor 15. Conveniently counter 14 may be a binary counter and coefficient assignor 15 may be a binary register yielding a binary coded number in lines 16 leading to coincidence detector 17. The several stages in multiplier counter 12 are also connected to detector 17. Counter 12 counts clock pulses until the count therein equals the number established by coefficient assignor 15 and, upon coincidence, a signal is delivered through line 18 to register 11 which reduces the count therein by one and also resets counter 12. The operation is continued until the count in register 11 is reduced to zero, whereupon a signal through line 21 closes gate 13.

The clock pulses passing through gate 13 are supplied through line 22 to acyclic accumulator 23. This is arranged as a modulo N counter operating in the number system on which the check digit was based, for example modulo 11. Denoting the inital digit stored in register 11 as $Y_1$ and the weight assigned to it as $X_1$, the number of pulses supplied to accumulator 23 for the first digit will be $Y_1 \times X_1$. The accumulator will cyclically count 11 pulses and start over, hence eliminating multiples of 11 in $Y_1 \times X_1$ and ending with the remainder or least significant digit in the modulo 11 number system registered therein.

When the next digit has been stored in register 11, gate 13 will be reopened and operation will proceed as before. Counter 14 will now register a count of 2, and actuate coefficient assignor 15 to supply outputs in lines 16 corresponding to the weight of the second digit. Upon completion of the cycle for the second digit, $Y_2 \times X_2$ pulses will have been supplied to accumulator 23, and it will have cycled from its previous positon to a new count representing the remainder in the modulo 11 system of the sum of the pulses for the first two digits.

The operation will continue as new digits are supplied until all digits have been processed. An enabling signal is then sent to zero detector 24. At this time the number of pulses applied to accumulator 23 will have been $Y_1X_1+Y_2X_2 \ldots Y_NX_N$. If the number, including the check digit, is correct, accumulator 23 will now be in a state corresponding to that used in inserting the check digit in the number being verified. It is here assumed that proper check results in accumulator 23 registering zero. This is detected in 24. If accumulator 23 registers zero, a Yes output is given, indicating that the number is good. If other than zero, a No output is given, indicating the number is bad.

As a simple illustrative example, assume that a number has a check digit based on modulo 11, and that the least significant digit has a weight of 7 and the second digit a weight of 6. The number "54" would then have a weighted value of 4×7 plus 5×6 equals 58. Divided by 11, this gives a remainder of 3 in the modulo 11 system. If the check digit is unweighted (that is, has a weight of 1), it will be 8 if the desired total in modulo 11 is to be zero. Thus the complete number may be written 854 or 548, depending on the choice of position for the check digit.

Assuming 854, this number will be checked by the apparatus of FIG. 1 by first entering the digit 4 in register 11. Digit counter 14 will actuate assignor 15 to supply a coefficient of 7 to coincidence detector 17. Counter 12 will count to 7, thereby reaching coincidence and being reset, and register 11 will decrement one to count 3. Counter 12 will again count to 7, register 11 will decrement to count 2, etc. When register 11 reaches zero, counter 12 will have counted 4×7 pulses, and accordingly 28 pulses will have been delivered to accumulator 23. Since the check digit has been determined modulo 11, accumulator 23 will be a modulo 11 counter. Assuming it starts at zero, it will then register a count of 6, the remainder after dividing 28 by 11.

The second digit "5" will now be entered in register 11, and digit counter 14 will actuate assignor 15 to supply a coefficient of 6 to detector 17. Counter 12 will count 6 pulses to reach coincidence, and the count will be repeated until register 11 reaches zero, thereby counting 5×6 pulses. The additional 3 pulses to accumulator 23 will have cycled it twice from the previous count of 6, plus 8 additional counts, thereby registering 3 in modulo 11.

The check digit 8 will now be entered in register 11, and a coefficient of 1 supplied to detector 17. Counter 12 will count once for each coincidence and resultant down count of register 11, yielding 8 pulses to accumulator 23 before gate 13 is closed. This will step the accumulator to zero, which is recognized by detector 24 and yields an output indicating the digit verification is good.

It is convenient to decode the input two-out-of-five coded digits to decimal digits for storing in register 11, since this facilitates count down. However, register 11 may be arranged to store digits in other than decimal form, if desired, with suitable provision for decreasing the stored digit value to zero by successive decrement signals.

Determining coincidence with the coefficient and counting down the digit register as just described is preferred. However, it is possible to determine coincidence with the input digit and count down the coefficient if desired. Thus the coefficient may be inserted in register 11 under control of the digit counter and the digit value supplied to coincidence detector 17. Then, upon each coincidence between counter 12 and the digit value, the coefficient will be reduced by one, and the operation continued until the coefficient is reduced to zero. This will give $X_n$ bursts of $Y_n$ pulses, rather than $Y_n$ bursts of $X_n$ pulses, for each digit of the multi-digit number.

In either case it will be noted that the number of pulses counted by 12 for each digit is the product of the digit and its assigned weighting coefficient, hence pulse counter 12 may be termed a multiplier counter.

FIG. 1 particularly shows apparatus for verifying a multi-digit number already containing a check digit. It can also be used to determine the check digit. In such case a multi-digit number without the check digit is entered and processed digit by digit, and the remainder registered in accumulator 23 is a measure of the check digit to be added. Assuming a weight of one for the check digit, as is common, the complement of the number remaining in the accumulator can be obtained by conventional procedures, and added to the multi-digit number. Or, additional pulses can be applied to the accumulator until it is set to zero, and the additional pulses counted to yield the check digit.

FIG. 2 shows a logic diagram for check digit verification of account numbers such as used in the credit card checking system described in the above-identified application. In that system desk units are provided for sales clerks to enter a credit card number and the number is sent to a central processor and there compared with numbers stored in a cyclic memory, such as a magnetic drum, the stored numbers representing delinquent or otherwise invalid accounts. An answer is then returned to the desk unit indicating whether the account is satisfactory or not. Provision is made for inserting or erasing account numbers in the memory. A number of signals are available which can be used in the check digit verification apparatus.

FIG. 3 shows a portion of the system of that application, greatly simplified for present purposes. Digit source 31 represents the source of an account number, such as a desk unit. A two-out-of-five code is used, having weights 0, 1, 2, 4, 7 for the five lines. A gate 32 is opened by a STROBE signal to enter the digits of an account number serially into Input Digit Register 33, least significant digit first. The STROBE signal may be derived from the digits as they are received, and delayed to correspond to the middle of a digit transmission. FIG. 4 shows the relative timing.

Register 33 has a number of sections equal to the number of digits in the account number. Although twelve are described in the above application, only eight are here shown, corresponding to an eight digit number. Each section has five binary stages. Upon occurrence of STROBE, the bits of the digit are transferred in parallel to the first section 34 of the register and actuate the corresponding two out of five stages therein. After entry, the bits of the first digit are rapidly shifted to the second section 35. This is accomplished by clock pulses CLK2$\phi$3 derived from timing signals in the magnetic drum, these pulses recurring at a frequency much higher than the digit frequency. After the second digit has been inserted in section 34, it is shifted to section 35, and the first digit shifted to the next section. This continues for successive digits. The last section 36 is connected back to the first section 34 by line 37, so that, when the eighth digit is shifted from 34 to 35, the first digit is shifted to 34. The final locations of the digits are shown in parentheses.

As the digits are shifted, it will be noted that all pass through section 35, and each digit remains therein until the next arrives. The states of the five stages in section 35 are denoted $\overline{IR1}$ through $\overline{IR5}$, and correspond to successive digits expressed in the two-out-of-five code.

The STROBE pulses correspond to successive digits, and are counted in the Digit Counter 38. This is a four stage binary counter, yielding IDC signals giving the states of the four stages as indicated. Inverted signals $\overline{IDC}$ are also obtained, although not shown.

Certain synchronizing signals are developed to control operations in the system of the above-identified application and are made use of in the check digit verifier. They are shown in FIG. 5. Signals $\phi_1$ are clock pulses recorded at bit intervals on the magnetic drum and have a relatively high frequency. $I_1$ pulses occur every five $\phi_1$ pulses and in phase therewith. Pulses $\phi_2$ and $\phi_3$ are derived from $\phi_1$ pulses and are delayed by one-third and two-thirds of a period respectively. G5 pulses start with a $\phi_1$ pulse preceding $I_1$ and terminate with the latter. G4 pulses occur in the $\phi_1$ period immediately preceding G5. G5 and $\phi_3$ pulses are gated together to form G5$\phi$3 pulses as shown in dotted lines at 41. Similarly G4 and $\phi_2$ are gated to form G4$\phi$2 pulses shown at 42. $I_1\phi$3 pulses start with an $I_1$ pulse and terminate at the beginning of the next $\phi$3 pulse.

When a STROBE pulse occurs it will have a random phase with respect to $I_1$ as shown at 43. A 4-stage clock pulse generator starts with the next $I_1$. CLK2 shows the output of the second stage and CLK2–CD the output of the third. The aforesaid application actually shows a three-stage generator, but a fourth stage is added when the check digit verifier is used, and the output of the fourth stage used in lieu of CLK3 shown in this application. This can be disregarded here.

CLK2 is gated with $\phi_2$ pulses to form CLK2$\phi$2 pulses as shown at 44. Five such pulses will occur in a CLK2 interval, and are used as shift pulses in FIG. 3. Hence transfer of digits from one section to the next will be complete before CLK2–CD occurs.

Usually inversions of the pulses shown in FIG. 5 are used in FIG. 2, and are written as corresponding barred pulses. Customarily, with barred pulses the assertion level is low, and with unbarred pulses the assertion level is high.

The gates and flip-flops used in FIG. 2 are conventional and shown in detail in the aforesaid application, and a brief explanation will suffice here. Gates are shown as semi-circles. If all inputs to a gate are low (say, negative to ground), the output will be high (say, ground). If any input is high, the output will be low. With only one input, the gate functions as an inverter. Two gates cross-coupled form a DC flip-flop.

The AC flip-flops are shown as rectangles. Reset is by a positive-going pulse to the R input, and makes the 0-output high and 1-output low. $A_0$ and $A_1$ are steering inputs. With $A_0$ high and $A_1$ low, a positive-going trigger pulse to T will set the flip-flop, making the 0-output low and 1-output high. With opposite polarities to the steering inputs, a trigger pulse to T will reset the flip-flop. Forcing a 1-output high will set the flip-flop.

Referring now to FIG. 2, gates 51 are supplied with various combinations of the signals from the five stages of section 35 of register 33 in FIG. 3. In the two-out-of-five code used, $\overline{IR4}$ and $\overline{IR3}$ will be low for digit 0, $\overline{IR4}$ and $\overline{IR1}$ will be low for digit 8, etc., as indicated by the digits shown in the gates. The gates are enabled by pulses $\overline{CLK2–CD}$ and G4$\phi$2 pulses to gate 52 which makes line 53 high during their simultaneous occurrence. The resultant high pulse is inverted in 54 and enables the gates 51. Consequently if a coded digit 0 through 8 is present at one of gates 51, the output of that gate will go high. In this embodiment it is unnecessary to provide a gate for the digit nine, since in the aforesaid application $\overline{CLK2–CD}$ is not developed unless a digit has been supplied to register 33 (FIG. 3), and digit 9 is assumed unless one of gates 51 is actuated. Hence digit 9 is shown dotted.

The Single Digit Store register is composed of nine flip-flops 55, 56, 57 connected as shown. All flip-flops are initially reset by $\overline{CLK2}$ via inverter 58, this occurring before $\overline{CLK2–CD}$ as shown in FIG. 5. At this time each preceding flip-flop steers the next succeeding flip-flop toward its reset condition. However, the left flip-flop 55 has its $A_0$ input connected to ground, and its $A_1$ input to a negative voltage, thus being steered toward set. When gates 51 are enabled, the gate corresponding to any digit from 0 to 8 will pull the 1-output of the preceding flip-flop 55, 56, 57 high, thereby setting it. If the digit is 9, no setting action is necessary since FF55 is already steered toward set. Subsequent trigger pulses applied to line 59 will transfer the set condition of any FF55, 56, to the next in sequence until the last FF57 is set.

The Multiplier Counter is shown as a four-stage counter comprising flip-flops 61 each back-connected to form a toggle flip-flop which switches from one state to the other when a positive going signal is applied to its T input. Clock pulses to be counted are $\overline{G5\phi3}$ pulses applied to gate 62, this gate being controlled by DC FF63, 63'. A positive pulse in line 53, corresponding to the enabling of gates 51, sets FF63, 63' and gives a low output to gate 62, thereby enabling it to pass $\overline{G5\phi3}$ pulses occurring thereafter. Reset is by a positive going pulse in line 64 from gate 65. If digit 0 has been entered into the digit register, the 0-output of stage 57 will be low and $\overline{G5\phi2}$ will reset FF63, 63' before $\overline{G5\phi3}$ occurs, thereby preventing a count in the Multiplier Counter. Otherwise counting will proceed until stage 57 is set by the count down of the register, to be described.

The 0- and 1-outputs of each stage of the multiplier counter are connected to respective gates 67. In this embodiment the weight of each digit is the same as the digit position. That is, for an 8-digit number the weights are 1, 2, 3 . . . 8 for respective digit positions beginning with the least significant digit. With this weighting system the states of the four stages in the input digit counter 38 of FIG. 3 for each digit counted give the proper weighting coefficient for that digit. The digit counter 38 has the same configuration as the multiplier counter. Consequently it is only necessary to compare the states of the four stages of the multiplier counter with the states of corresponding stages of the digit counter in order to determine coincidence.

The latter states are denoted $IDC2^0$, $\overline{IDC2^0}$ and $IDC2^3$, $\overline{IDC2^3}$ for the 1- and 0-outputs of the four stages, and are supplied to gates 67 as indicated. Each gate 67 has the 0-output of one counter stage and the 1-output of the corresponding stage of the other counter applied thereto. Upon coincidence corresponding stages in both counters will be in the same states. Accordingly, all gates 67 will have one input high and the other low, yielding low outputs to both of lines 68 and 69. For non-coincidence at least one pair of corresponding stages in the two counters will be in opposite states, making both inputs to one of gates 67 low and the corresponding output line 68 or 69 high.

Lines 68 and 69 are inputs to gate 71 and, with both lines low at coincidence, the output of gate 71 will be high and that of gate 72 low. This will enable gate 73 to pass the next $\overline{I_1\phi3}$ pulse, making line 59 high. This resets the multiplier counter and triggers the Single Digit Store register to produce a decrement one therein. That is, if digit 5 had initially been entered, the register will now be shifted to the state of a digit 4. During this operation the pulses counted by the Multiplier Counter will have been delivered by line 75 to the Accumulator.

If a digit 1 had initially been entered in the digit register, stage 57 will now be set and the next $\overline{G5\phi2}$ pulse to gate 65 will reset FF63, 63' and stop the flow of $\overline{G5\phi3}$ pulses to the Multiplier Counter. Thus one pulse will have been delivered to line 75. If the digit is higher than 1, operation will continue until the digit entered in the register has been counted down to zero. For a digit 9, the initial trigger pulse in line 59 will set FF55, and nine trigger pulses will be required to set FF57 and terminate the counting by resetting FF63, 63'.

When the second digit has been inserted in the input register 33 of FIG. 3, another CLK2–CD will be developed and insert the second digit in the Single Digit Store register. Since this second digit has a weight of 2, the IDC inputs to the Coincidence Detector will change accordingly and the Multiplier Counter will count two for each cycle. Two pulses will be delivered to line 75 for each cycle until the digit has been counted down to zero.

This operation will continue digit by digit, with the IDC inputs changing for each digit to produce the desired weighting coefficients, until all digits have been processed. This will be recognized by the digit counter 38 in FIG. 3, no more STROBE pulses will be developed, and consequently no more $\overline{CLK2-CD}$ pulses. FF63, 63' will remain reset after the last pulse in line 64 corresponding to count down of the last digit, and no more $\overline{G5\phi3}$ pulses will pass through gate 62 to the Multiplier Counter and to the Accumulator.

Considering now the Accumulator, four flip-flop stages 81 are connected similarly to the Multiplier Counter, but provision is made to reset it upon reaching a count of 11, thereby making it a modulo 11 counter. At count 11 the input lines to gate 82 are all low, making its output line 83 high. This is in the direction to set FF84, 84'. However, $\overline{I1\phi3}$ to 84' prevents immediate setting. This signal is the inverse of $I1\phi3$ shown in FIG. 5, and is normally high to hold the FF reset. However, when it goes low at $I_1$ time next following the count of 11, the high line 83 sets the FF, making line 85 high to reset the accumulator to zero.

Subsequent pulses in line 75 will continue triggering the accumulator, and it will repeatedly count to 11 and reset to zero before the next triggering pulse arrives.

When all digits of the number have been processed, the accumulator should register zero if the number is correct, and the high resetting signal in line 85 will have set FF86, 86'. This makes line 87 to gate 88 high, giving the low CHK ER signal which indicates that no error exists and the number is valid insofar as digit check is concerned.

If, however, the number is invalid, a subsequent pulse in line 89 will reset FF86, 86' and make line 87 low. This will enable gate 88. The signal $\overline{CS}$ is developed in the system of the aforesaid application after the digit information in register 33 of FIG. 3 has been used for drum exploration, and goes low at the time it is desired to know whether the digit check has been valid. If valid, the CHK ER signal will be low, as described above. If invalid, line 87 will be low when $\overline{CS}$ goes low, giving a high CHK ER signal. The signal may be used to send an error answer, or to discard the number, etc. At this time a high SEND signal is developed in the aforesaid application and is conveniently used to set FF84, 84', thereby making line 85 high to reset the accumulator, ready for another account number.

FF91, 91' is set when CHK ER goes high, to light lamp 92 through an amplifier 93. The FF may be reset by a high ERROR RESET signal, produced by a manual pushbutton or otherwise.

As a further example, assume that the number to be checked is 32857152, with the check digit at the right and the weights 8, 7, . . . 2, 1 for the respective digit positions from left to right. With these weights the sum of the weighted products without the check digit is 152. Adding the check digit gives 154 which is a multiple of 11. With the right hand (check) digit entered first, the multiplier counter will cycle twice and give one pulse per cycle to the accumulator. For the next digit (5), the counter will cycle five times, supplying two pulses per cycle to the accumulator. This will continue until, for the digit (3) the multiplier will cycle three times and supply eight pulses per cycle to the accumulator. After each eleven pulses, the accumulator will be reset to zero and resume counting. After all 154 pulses have been applied, the accumulator will have cycled 14 times, ending up at zero, thereby indicating that the number is valid.

Instead of assigning weighting coefficients to the digits equal to their position, arbitrary coefficients may be assigned by matrixing the outputs of the digit counter to yield suitable coded counts for the coincidence detector for each digit counted, etc.

The invention has been described in connection with specific embodiments, and specific logic has been shown. It will be understood that the arrangements may be modified to suit the requirements of a particular application, and the logic conformed to the system in which the check digit apparatus is used.

We claim:
1. Apparatus responsive to a multi-digit number to generate a check digit corresponding thereto, said number having digits $Y_N$ where Y is the digit value and N is the relative digit position, said number being based on a selected modulo system where M is the modulo, said apparatus comprising:
   first means for receiving said number in serial digit format;
   second means responsive to each digit as received to apply thereto a weighting coefficient $X_N$ where X is the weighting value and N in said position;
   third means responsive to each digit with weighted coefficient to generate a corresponding timing field of pulse group bursts, each field consisting of Y group bursts, each group burst containing X pulses of like waveform, Y and X having vales corresponding to the N position of said each digit;
   one digit stage counter for counting individual pulses from an initial count of zero to a maximum count of M, said counter being provided with a mechanism for automatically recycling the counter to zero upon receipt of the $(M+1)$ pulse; and
   fourth means to supply said fields in serial burst, serial pulse format to said counter, the final count in said counter, after processing of the test number has been completed, representing the check digit.

2. Apparatus as set forth in claim 1 further including fifth means coupled to said counter and responsive to said final count to provide a first output when said final count is zero and to provide a second output when said final count differs from zero.

References Cited

UNITED STATES PATENTS

| | | | |
|---|---|---|---|
| 2,634,052 | 4/1953 | Bloch | 340—146.1 X |
| 2,886,240 | 5/1959 | Linsman | 235—153 |
| 2,888,199 | 5/1959 | Reuterman et al. | 235—153 |
| 2,911,149 | 11/1959 | Rouche | 235—153 |
| 2,974,865 | 3/1961 | Reuterman et al. | 235—153 |
| 3,040,985 | 6/1962 | Glaser et al. | 235—153 |
| 3,138,701 | 6/1964 | Davis | 235—153 |
| 3,163,748 | 12/1964 | Schafer et al. | 235—153 |
| 3,384,902 | 5/1968 | Schroder et al. | 340—146.1 |

MALCOLM A. MORRISON, Primary Examiner

CHARLES E. ATKINSON, Assistant Examiner

U.S. Cl. X.R.

235—153